US011042003B2

(12) United States Patent
Coenegracht et al.

(10) Patent No.: US 11,042,003 B2
(45) Date of Patent: Jun. 22, 2021

(54) ADAPTER TUBE FOR A CABLE FIXATION AND SEALING SYSTEM

(71) Applicant: CommScope Connectivity Belgium BVBA, Kessel-Lo (BE)

(72) Inventors: Philippe Coenegracht, Hasselt (BE); Mohamed Aznag, Scherpenheuvel (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 12 days.

(21) Appl. No.: 16/690,848

(22) Filed: Nov. 21, 2019

(65) Prior Publication Data

US 2020/0166724 A1 May 28, 2020

Related U.S. Application Data

(63) Continuation of application No. 15/128,080, filed as application No. PCT/EP2015/054408 on Mar. 3, 2015, now Pat. No. 10,495,838.

(Continued)

(51) Int. Cl.
*G02B 6/44* (2006.01)
*G02B 6/38* (2006.01)

(52) U.S. Cl.
CPC ......... *G02B 6/4494* (2013.01); *G02B 6/3825* (2013.01); *G02B 6/443* (2013.01);
(Continued)

(58) Field of Classification Search
CPC ...... G02B 6/3825; G02B 6/443; G02B 6/444; G02B 6/4444; G02B 6/4477; G02B 6/4494
See application file for complete search history.

(56) References Cited

U.S. PATENT DOCUMENTS 6,021,246 A 2/2000 Koshiyama et al.
6,314,224 B1 * 11/2001 Stevens ................ G02B 6/4426
385/113

(Continued)

FOREIGN PATENT DOCUMENTS

EP 0 883 006 A2 12/1998
WO 2013/010180 A1 1/2013
(Continued)

OTHER PUBLICATIONS

International Search Report and Written Opinion of the International Searching Authority for International Patent Application No. PCT/EP2015/054408 dated May 11, 2015, 9 pages.

(Continued)

*Primary Examiner* — Daniel Petkovsek
(74) *Attorney, Agent, or Firm* — Merchant & Gould P.C.

(57) ABSTRACT

A method of fixing and moisture sealing a telecommunications cable that includes a jacket defining a jacket perimeter having a generally non-circular transverse cross-section with respect to an enclosure includes placing an adapter tube over the jacket, the adapter tube defining a perimeter having a generally circular transverse cross-section and a through-hole having a generally non-circular transverse cross-section; compressing the adapter tube around the jacket with a clamp; placing a portion of the adapter tube within a gel block of the enclosure, the gel block being provided at a location different than the location of the clamp; moisture sealing the adapter tube with sealant material of the gel block; and fixing the adapter tube and the telecommunications cable with respect to the enclosure to oppose pulling forces.

6 Claims, 10 Drawing Sheets

Related U.S. Application Data

(60) Provisional application No. 61/970,215, filed on Mar. 25, 2014.

(52) U.S. Cl.
CPC ......... *G02B 6/4444* (2013.01); *G02B 6/4477* (2013.01); *G02B 6/444* (2013.01)

(56) References Cited

U.S. PATENT DOCUMENTS

| | | | |
|---|---|---|---|
| 7,442,884 B2 * | 10/2008 | Ball | H02G 15/013 16/2.1 |
| 7,780,173 B2 * | 8/2010 | Mullaney | H02G 3/22 277/621 |
| 10,495,838 B2 * | 12/2019 | Coenegracht | G02B 6/3825 |
| 2002/0062977 A1 | 5/2002 | Battey et al. | |
| 2013/0014974 A1 | 1/2013 | Burke et al. | |

FOREIGN PATENT DOCUMENTS

| | | |
|---|---|---|
| WO | 2013/149587 A1 | 10/2013 |
| WO | 2013/149846 A1 | 10/2013 |

OTHER PUBLICATIONS

Related U.S. Appl. No. 61/766,495, filed Feb. 19, 2013, 26 pgs.

* cited by examiner

ADAPTER TUBE FOR A CABLE FIXATION AND SEALING SYSTEM

CROSS REFERENCE TO RELATED APPLICATION

This application is a Continuation of U.S. patent application Ser. No. 15/128,080, filed Sep. 21, 2016, now U.S. Pat. No. 10,495,838, which is a U.S. National Stage of PCT/EP2015/054408, filed Mar. 3, 2015, which claims the benefit of U.S. Provisional Application No. 61/970,215, filed Mar. 25, 2014, the disclosures of which are hereby incorporated herein by reference. To the extent appropriate, a claim of priority is made to each of the above disclosed applications.

TECHNICAL FIELD

The present disclosure relates generally to telecommunications equipment. More particularly, the present disclosure relates to a system for fixing and sealing telecommunications cables to telecommunications equipment.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers.

Telecommunications enclosures are typically sealed to inhibit the intrusion of moisture or other contaminants. Pressurized gel-type seals have been used to effectively seal the locations where telecommunications cables enter and exit telecommunications enclosures. While pressurized cable seals have generally proven to be effective, improvements in this area are still needed.

SUMMARY

Certain aspects of the present disclosure relate to effective arrangements for providing fixation or sealing for telecommunications cables.

The present disclosure generally relates to systems for providing effective gel-based sealing for cables that have non-circular transverse cross-sections. The systems of the present disclosure may be used to improve sealing around a cable having a non-circular transverse cross-section, such as a flat drop cable, which otherwise might not have an effective radial gel seal around the entire perimeter of the cable due to its shape.

According to one inventive aspect, the disclosure relates to a telecommunications cable fixation and sealing kit comprising an adapter tube configured to slidably receive a telecommunications cable, the adapter tube defining a perimeter having a generally circular transverse cross-section and defining a throughhole having a generally non-circular transverse cross-section.

According to another aspect, the disclosure relates to a telecommunications cable fixation and sealing system comprising a telecommunications cable including a jacket defining a jacket perimeter having a generally non-circular transverse cross-section and an adapter tube slidably placed over the jacket of the telecommunications cable, the adapter tube defining a tube perimeter having a generally circular transverse cross-section and defining a throughhole having a generally non-circular transverse cross-section that is configured to receive the telecommunications cable.

According to another aspect, the disclosure relates to a telecommunications cable fixation and sealing system comprising a telecommunications cable including a jacket defining a jacket perimeter having a generally non-circular transverse cross-section, an adapter tube slidably placed over the jacket of the telecommunications cable, the adapter tube defining a tube perimeter having a generally circular transverse cross-section and defining a throughhole having a generally non-circular transverse cross-section that is configured to receive the telecommunications cable, and a flexible metallic strip bent at least partially around the adapter tube and the cable inserted therein, wherein the flexible metallic strip is fixed with respect to a cable fixation device that is configured for removable mounting to a telecommunications fixture.

According to another aspect, the disclosure relates to a method of fixing and moisture sealing a telecommunications cable including a jacket defining a jacket perimeter having a generally non-circular transverse cross-section with respect to a telecommunications enclosure. The method comprises slidably placing an adapter tube over the jacket of the telecommunications cable, wherein the adapter tube defines a tube perimeter having a generally circular transverse cross-section and defines a throughhole having a generally non-circular transverse cross-section that is configured to receive the telecommunications cable, placing a portion of the adapter tube that surrounds the telecommunications cable within a gel block of the telecommunications enclosure, moisture sealing the adapter tube that surrounds the telecommunications cable with sealant material of the gel block, and fixing the adapter tube and the telecommunications cable with respect to the telecommunications enclosure to oppose pulling forces.

According to yet another aspect, the disclosure relates to a method of converting a telecommunications cable including a jacket defining a jacket perimeter having a generally non-circular transverse cross-section to a structure defining a perimeter having a generally circular transverse cross-section, wherein the method comprises slidably placing an adapter tube over the jacket of the telecommunications cable, wherein the adapter tube defines a tube perimeter having a generally circular transverse cross-section and defines a throughhole having a generally non-circular transverse cross-section that is configured to receive the telecommunications cable.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
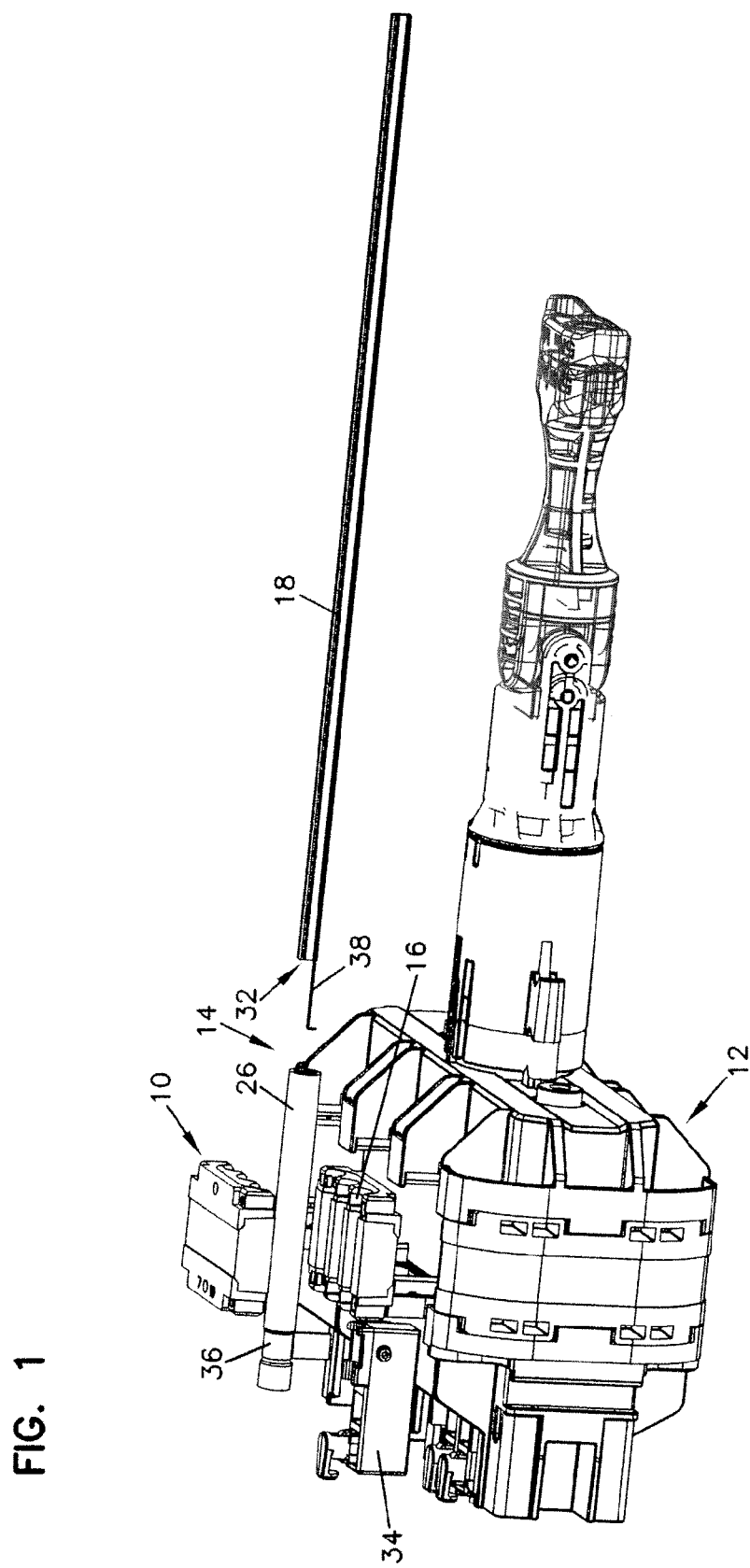
FIG. 1 is an exploded perspective view of a telecommunications enclosure shown with a cable fixation and sealing system having examples of inventive aspects in accordance with the present disclosure.
Figure 2:
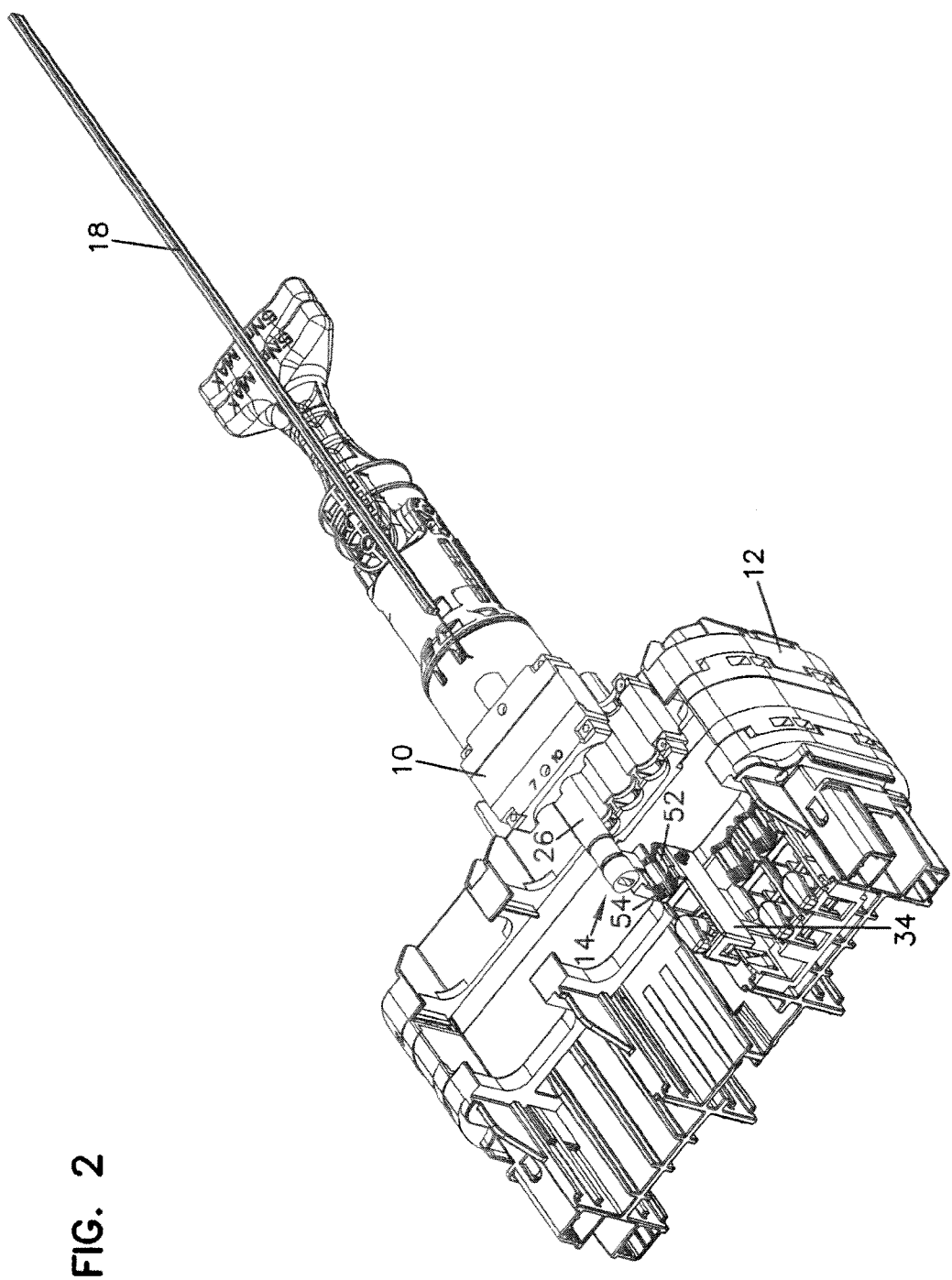
FIG. 2 is another exploded perspective view of the enclosure and the cable fixation and sealing system of FIG. 1.
Figure 3:
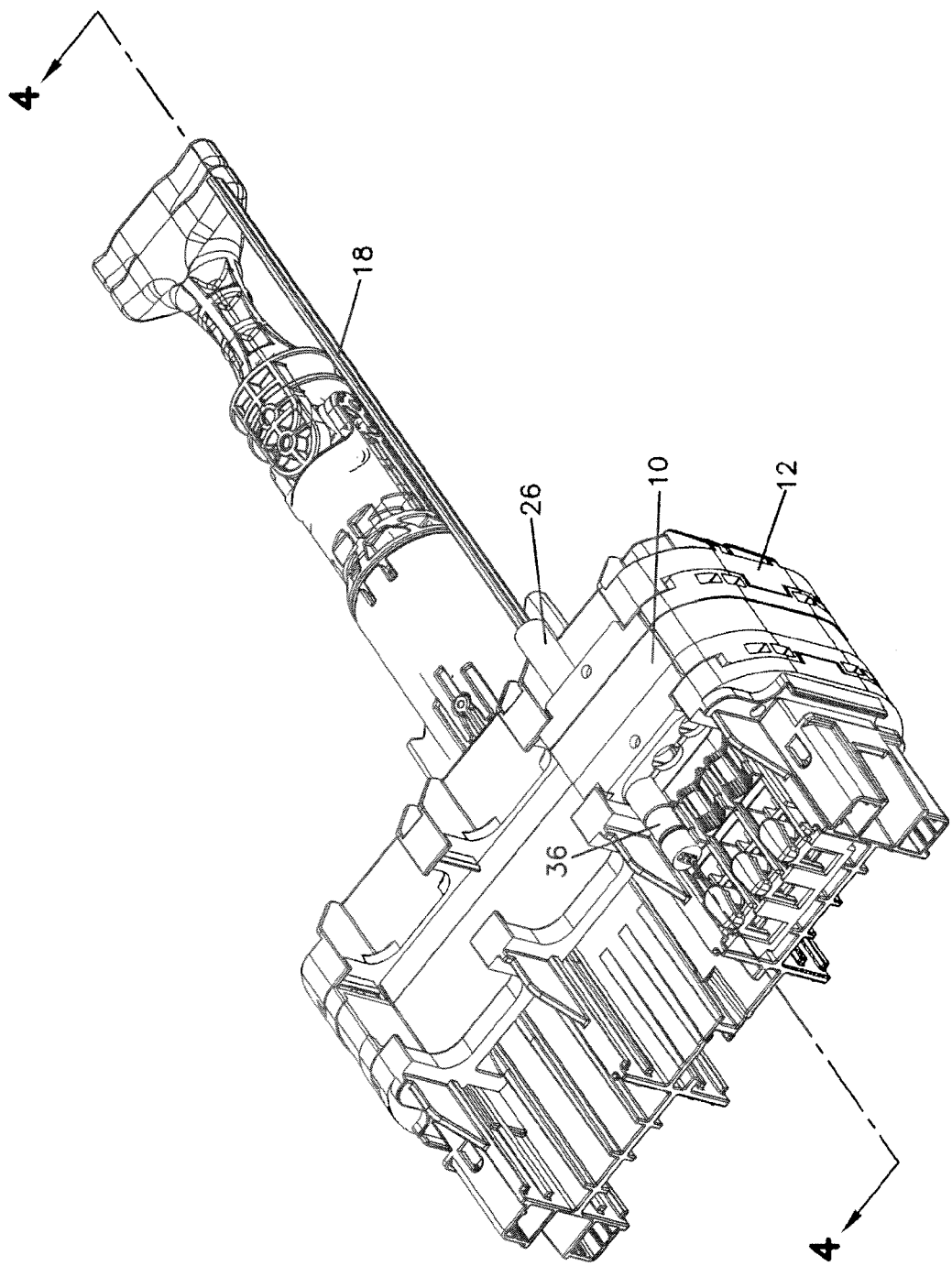
FIG. 3 illustrates the cable fixation and sealing system of FIG. 1 in an assembled configuration.
Figure 4:
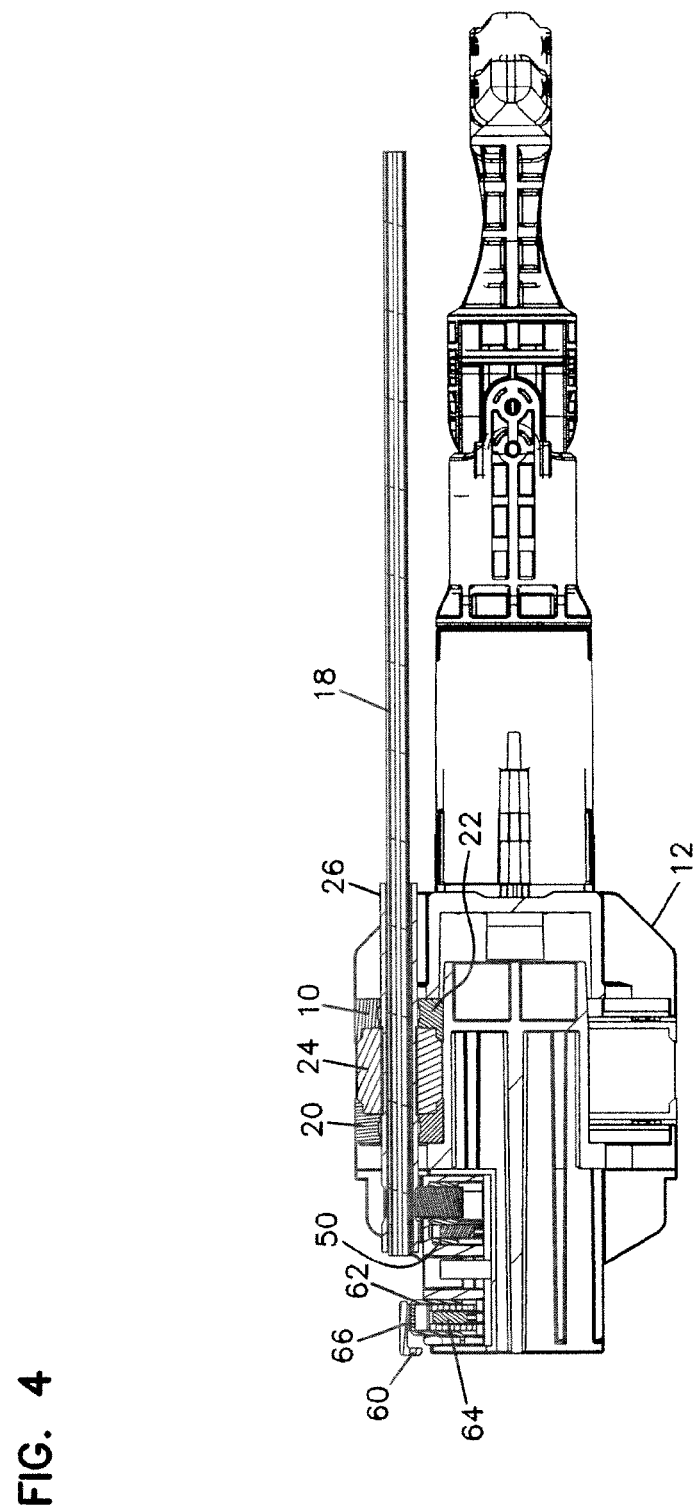
FIG. 4 is a cross-section taken along line 4-4 of FIG. 3.

The present disclosure relates to arrangements and methods for providing effective fixation and sealing of telecommunications cables to telecommunications equipment.

Existing cable sealing devices may not always produce an adequate seal at the locations where telecommunications cables enter and exit telecommunications equipment such as telecommunications enclosures, especially for telecommunications cables having non-circular transverse cross-sections. Due to their shape, such cables might not be subject to equal radial loading forces of the seal around the entire perimeter of the cables.

It would be desirable to provide for a system that allows cables with non-circular transverse cross-sections, such as flat drop cables, to be effectively sealed and fixed with respect to devices that are normally configured for fixing and sealing round cables.

According to one example embodiment, the telecommunications equipment discussed herein are fiber optic equipment, and the telecommunications cables discussed herein are fiber optic cables. Such cables can include jackets enclosing one or more buffer tubes. The buffer tubes can contain one or more optical fibers. The cables can also include strength members (e.g., aramid yarn, fiber reinforced epoxy rods, etc.) for reinforcing the cables and for limiting damage to optical fibers within the cables that are exposed to pulling forces.

It should be noted that a fiber optic cable is simply one example of a telecommunications cable that may be used to describe the inventive features of the cable sealing and fixation systems of the present disclosure, and other types of cables, including electrical or hybrid electrical/fiber optic cables, may be sealed and fixed with the systems discussed herein.

Referring now to FIGS. 1-5, a gel block (or a seal block) portion 10 of an example telecommunications enclosure 12 is shown with the system 14 of the present disclosure. The telecommunications enclosure 12 is preferably environmentally sealed to inhibit the intrusion of moisture, dust or other contaminants. Sealed cable entry/exit locations 16 are preferably provided at the gel block 10 for allowing telecommunications cables 18 (e.g., fiber optic cables in the depicted embodiment) to be routed into and out of the telecommunications enclosure 12 without compromising the overall environmentally sealed nature of the telecommunications enclosure 12. The telecommunications enclosure 12 may be adapted for housing and protecting telecommunications optical and/or electrical components such as splices (e.g., mechanical splices, fusion splices, etc.), power splitters, multiplexing components (e.g., wavelength division multiplexers (WDM's)), or other components. The telecommunications enclosure 12 may also include connection locations for connection of external cables to patch into the components that may be housed within the enclosure 12.

The telecommunications enclosure 12 can be formed of one or more of a variety of materials capable of constraining the cable sealing arrangement while the cable sealing arrangement is loaded under pressure in the secured position. Example materials include one or more plastic materials such as polypropylene, polyamide, polycarbonate, acrylobutadiene-styrene (ABS), or the like. Additionally or alternatively, such members may be formed from one or more metals such as aluminum or steel.

The telecommunications enclosure 12 described herein and illustrated in the figures is simply one example of an enclosure used to describe the features and the operation of the sealing and fixation system 14 of the present disclosure, and the inventive features are fully applicable to other enclosures.

Various cables 18 can enter and exit enclosure 12 through the gel block 10. The gel block 10 has first and second portions 20, 22, which together seal around cables 18. The sealant 24 provided at the gel block 10 of the depicted enclosure 12 may be formed of any one or more of a variety of sealing materials. Elastomers, including natural or synthetic rubbers (e.g., EPDM rubber or silicone rubber) can be used. In other embodiments, polymeric foam (e.g., open cell or closed cell) such as silicone foam can be used. In still other embodiments, the sealant 24 may comprise, for example, silicone gel, urea gel, urethane gel, thermoplastic gel, or any suitable gel or geloid sealing material. Such gels are normally substantially incompressible when placed under a compressive force and normally flow and conform to their surroundings, thereby forming sealed contact with other surfaces. Example gels include oil-extended polymers. The polymer may, for example, comprise an elastomer or a block copolymer having relatively hard blocks and relatively elastomeric blocks. Example copolymers include styrene-butadiene or styrene-isoprene di-block or tri-block copolymers. In still other embodiments, the polymer of the sealant 24 may include one or more styrene-ethylene-propylene-styrene block copolymers. Extender oils used in example sealants 24 may, for example, be hydrocarbon oils (e.g., paraffinic or naphthenic oils or polypropene oils, or mixtures thereof). The sealants 24 can also include additives such as moisture scavengers, antioxidants, tackifiers, pigments, and/or fungicides. In certain embodiments, sealants 24, in accordance with the principles of the present disclosure, have ultimate elongations greater than 100 percent with substantially elastic deformation to an elongation of at least 100 percent. In other embodiments, sealants 24, in accordance with the principles of the present disclosure, have ultimate elongations of at least 200 percent, or at least 500 percent, or at least 1000 percent. Ultimate elongation can be determined by the testing protocol set forth at ASTM D412.

Now referring to FIGS. 6-10, the system 14 of the present disclosure includes an adapter tube 26 that is configured to slidably receive a cable 18 having a non-circular transverse cross-section. As noted above, cables 18 having non-circular transverse cross-sections may include drop cables that have flat or figure-eight profiles.

The adapter tube 26 is elongate and includes a generally circular outer perimeter 28 when viewed from a transverse cross-section. The round profile of the adapter tube 26 allows the radial sealing forces of the sealant 24 within the gel block 10 to be generally equally distributed around its entire perimeter 28. The adapter tube 26 defines a throughhole or port 30 that is configured to receive a telecommunications cable such as the fiber optic cable 18 discussed herein. In the depicted embodiment, the throughhole or port 30 defines a generally rectangular configuration and is shaped to receive a flat drop cable 18. Other shapes are possible for the port 30 depending upon the type of cable 18 that needs to be converted to a round configuration. Certain example shapes for the transverse cross-section of the port 30 may include oblong, elliptical, rectangular, square, and other non-circular shapes. According to an example embodiment, the adapter tube 26 is manufactured from a flexible, rubber like material.

During use, the adapter tube 26 is inserted over a first end 32 of the cable 18 and is used to seal and fix the first end 32 of the cable 18 to the enclosure 12 as will be described below. The adapter tube 26 is sized such that it is long enough to extend past the gel block 10 to an exterior of the enclosure 12 when the adapter tube 26 has been fixed within the enclosure 26.

As shown in FIGS. 1-6, the fixation and sealing system 14 of the present disclosure may also include a cable fixation module 34 and a fixation strip 36 that is used with the adapter tube 26 for fixing the cables 18. The cable fixation module 34 is a device that is normally configured to clamp (with the use of the fixation strip 36) cables having a circular transverse cross-section. Thus, the adapter tube 26 of the present disclosure, in addition to providing improved sealing, also provides the advantage of being able to use a fixation device that is normally used to fix round cables.

The fixation strip 36 may be a metallic (e.g., stainless-steel) strip that is flexible enough to be bent around the perimeter 28 of the adapter tube 26. The adapter tube 26 and the fixation strip 36 may be provided as part of a cable fixation and sealing kit 15 for use with a cable fixation device such as the cable fixation module 34.

When fixing a cable 18 having a non-circular transverse cross-section using the system 14 of the present disclosure, the end 32 of the cable 18 that is to be fixed is first prepped (e.g., stripped), exposing a strength member 38 of the cable 18. Once the adapter tube 26 has been slidably inserted over the end 32 of the cable 18, the fixation strip 36 is wrapped around the adapter tube 26 adjacent the end 32 of the cable 18 to be fixed.

The cable fixation module 34 is seen in FIGS. 1-6. As noted above, the cable fixation module 34 is a fixation device that is removably mounted within an interior of a telecommunications enclosure 12 and is a device that is normally used for fixing round cables to the enclosure 12. The system 14 of the present disclosure allows cables 18 having a non-circular transverse cross-section to be converted and be fixed using a device such as the cable fixation module 34.

Figure 5:
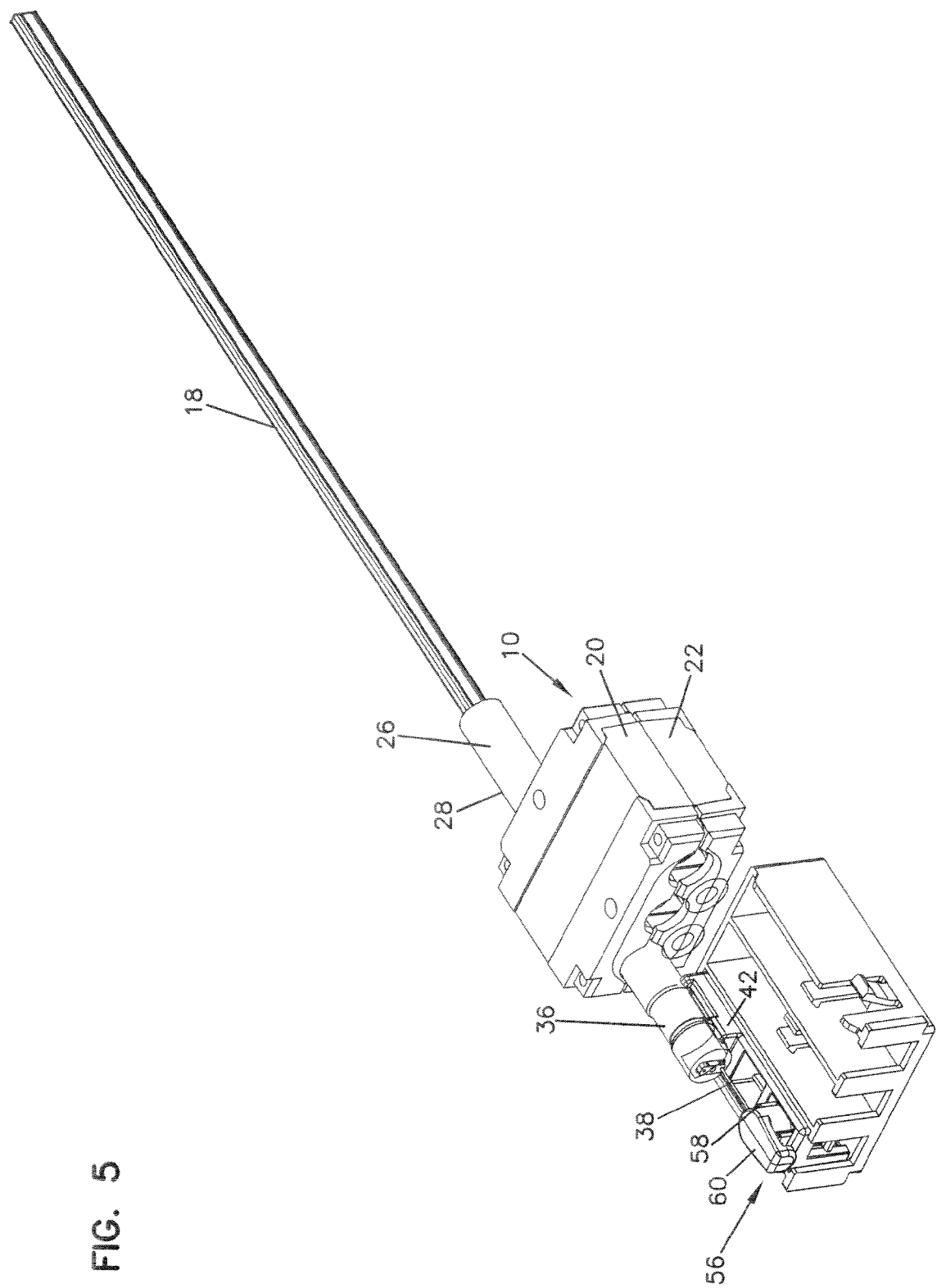
FIG. 5 illustrates the cable fixation and sealing system of FIG. 1 with a gel block portion of the enclosure.
Figure 6:
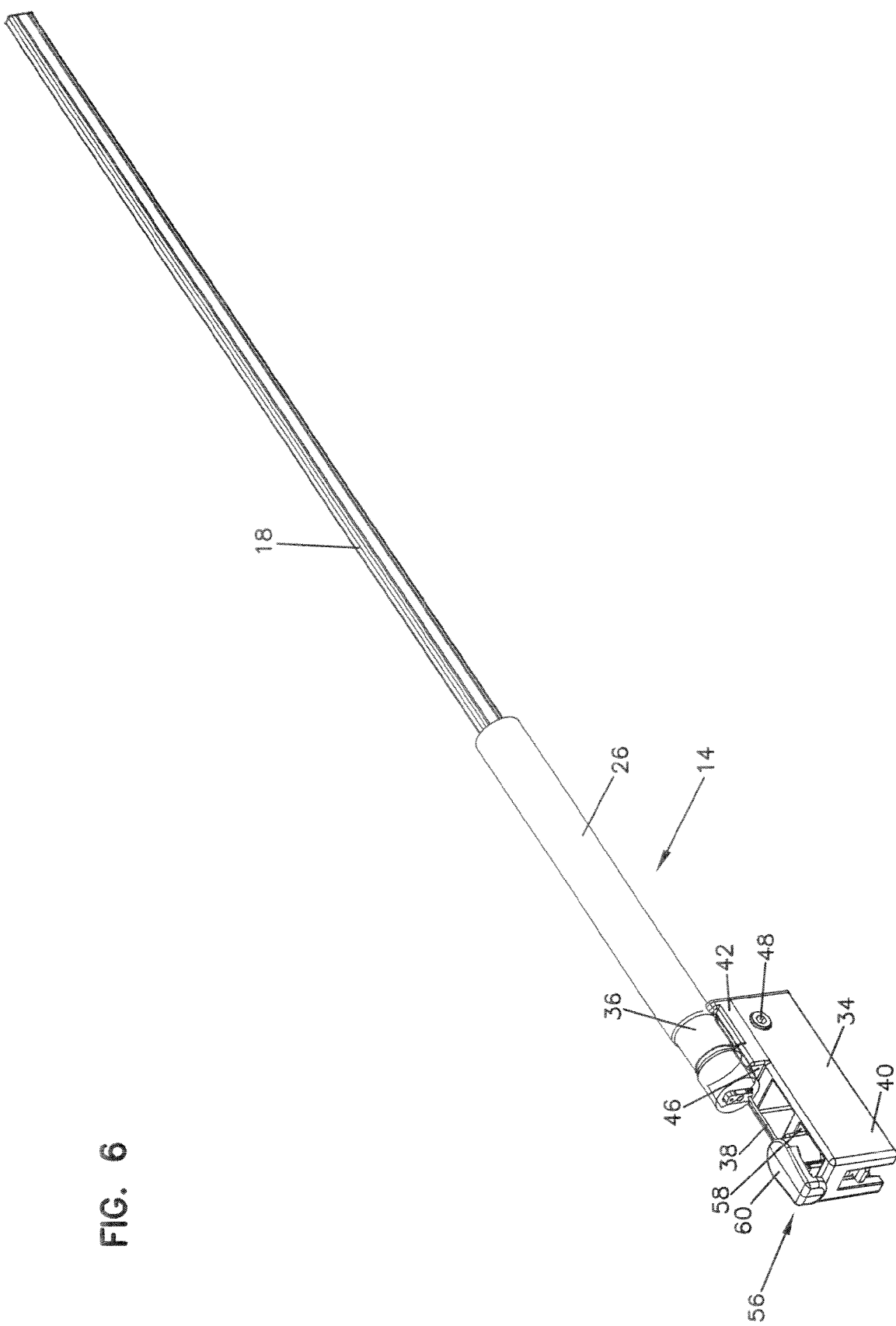
FIG. 6 illustrates the cable fixation and sealing system of FIG. 1 with the cable fixation device that is configured to be removably mounted within the enclosure of FIG. 1.
Figure 7:
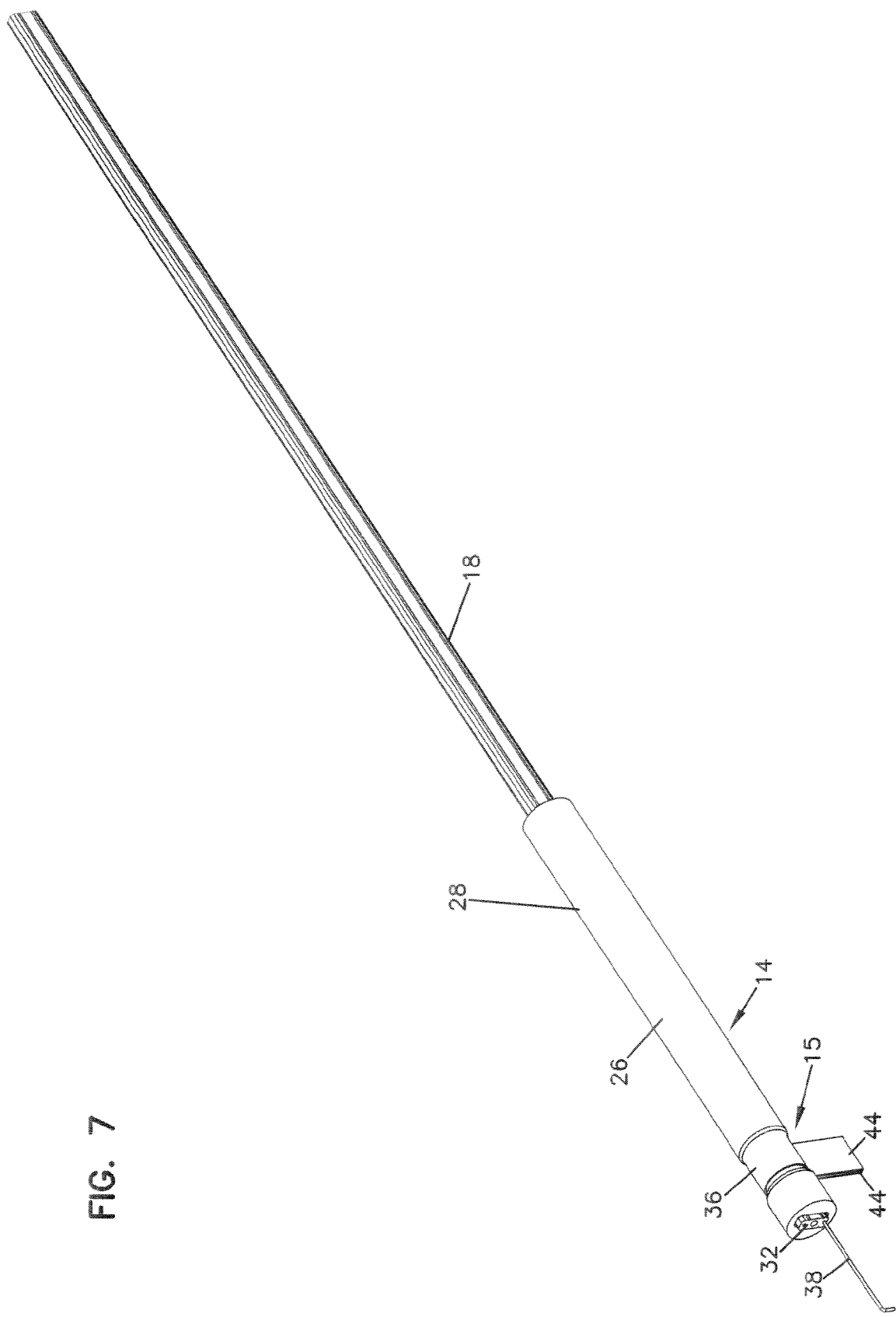
FIG. 7 illustrates the adapter tube and the fixation strip of the cable fixation and sealing system of FIG. 1 surrounding a fiber optic cable, wherein the cable includes a strength member protruding axially outward.
Figure 8:
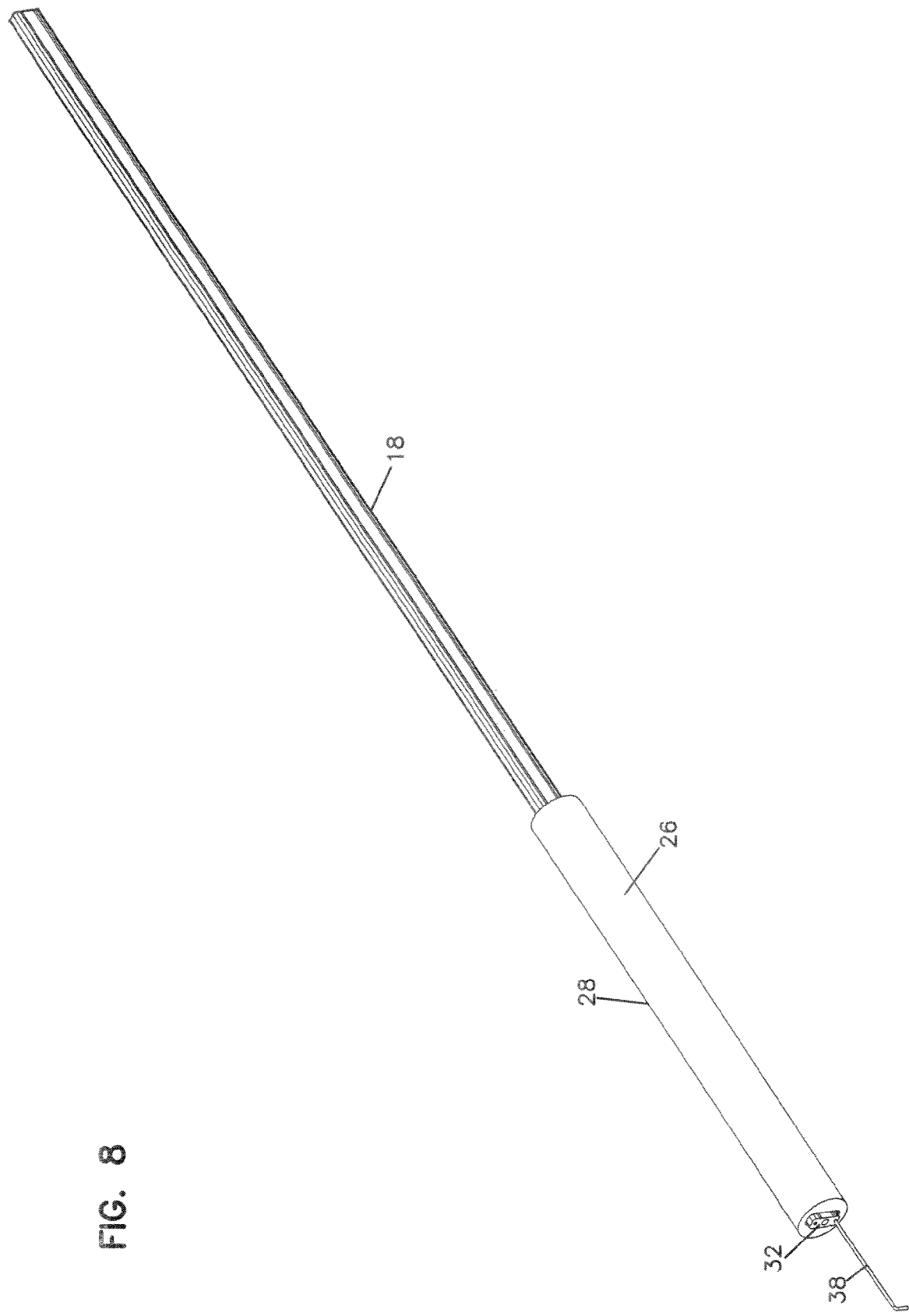
FIG. 8 illustrates the adapter tube and the fiber optic cable of FIG. 7.
Figure 9:
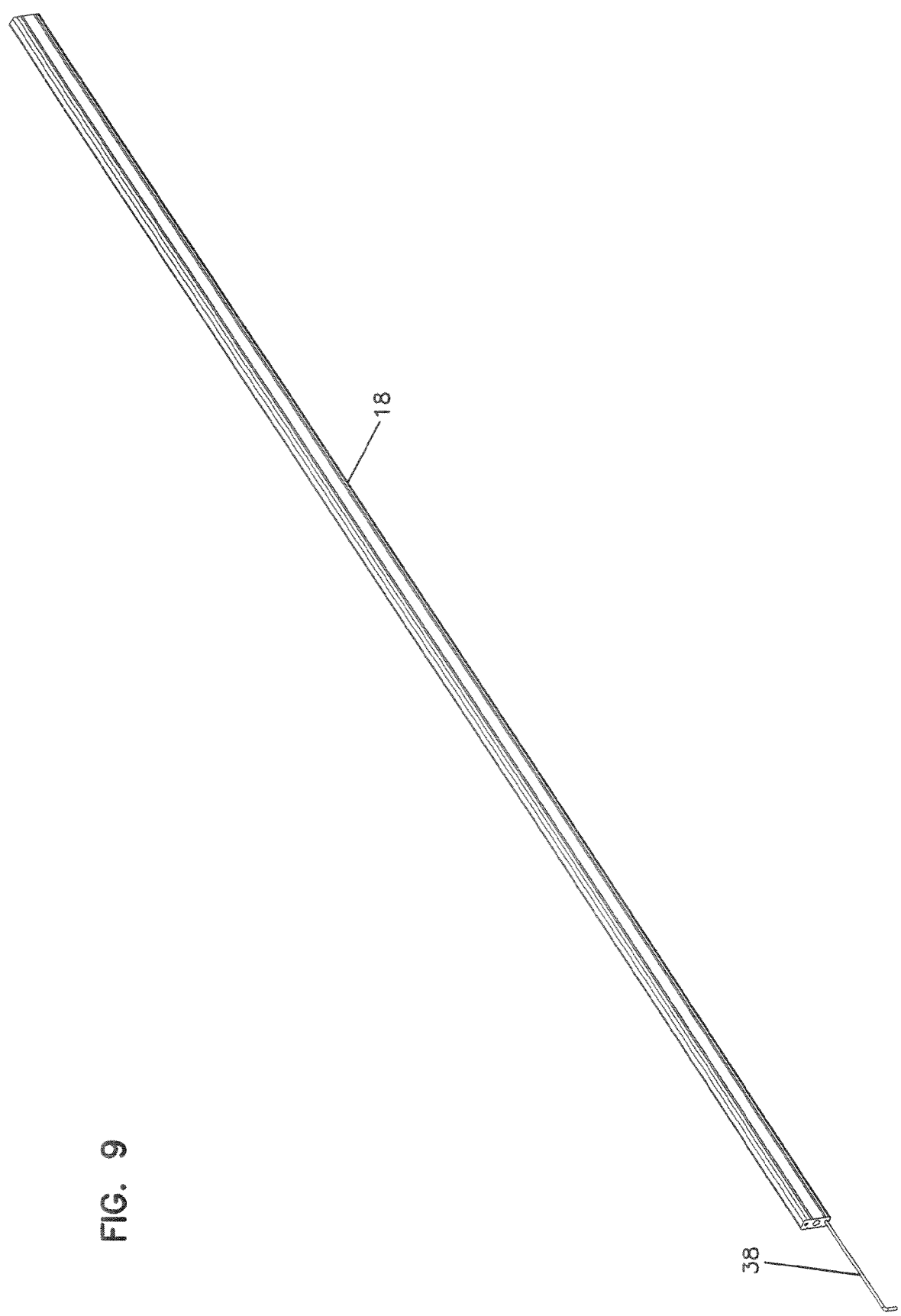
FIG. 9 illustrates the fiber optic cable of FIGS. 7 and 8, wherein the cable is one example of a cable having a non-circular transverse cross-section that can be sealed and fixed using the system of the present disclosure.

Referring to FIGS. 5 and 6, the depicted cable fixation module 34 includes a main body 40 and a first body 42 therewithin. Once the metallic strip 36 has been wrapped around the perimeter 28 of the adapter tube 26, the free ends 44 of the metallic strip 36 are inserted into a pocket 46 defined by the main body 40. A first fastener 48 is used to hold strip 36 in position. A second fastener 50 (see FIG. 4) moves first body 42 upwardly to cause tightening of the strip 36 around adapter tube 26. Thus, first fastener 48 locks the strip 36 and allows for tightening of the strip 36 by the second fastener 50.

The cable fixation module 34 also includes portions 52 with teeth 54 adjacent the pocket 46. The teeth 54 are configured to dig into the material of the adapter tube 26 as the tube 26 is tightened. The teeth 54 limit movement of the adapter tube 26 that might be due to rotational forces on the cable 18.

A strength member clamp assembly 56 of the fixation module 34 is mounted in a pocket 58 adjacent the front of the main body 40. The strength member assembly 56 includes an L-shaped cover member 60 and a pressing element 62. A strength member 38 of the cable 18, which protrudes from the adapter tube 26, is clamped between the cover member 60 and the pressing element 62 by a third fastener 64 (see FIG. 4) which moves the pressing element 62 with respect to the cover member 60. Before being clamped, the strength member 38 is inserted into a strength member pocket 66 defined by the cover member 60.

The cover member 60 of the strength member clamp assembly 56 is movably adjustable with respect to the main body 40, generally perpendicular relative to the cable axis. In this manner, the strength member clamp assembly 56 can be used to mount a variety of strength members in different positions. For example, the strength member clamp assembly 56 can generally align with a strength member 38 of a cable 18 along a horizontal plane.

Further details relating to the configuration and the operation of cable fixation modules similar to module 34 of the present disclosure are shown and described in U.S. Provisional Application Ser. No. 61/766,495, filed Feb. 19, 2013, entitled "CABLE CLAMP AND TELECOMMUNICATIONS ENCLOSURE," which application is incorporated herein by reference in its entirety.

Figure 10:
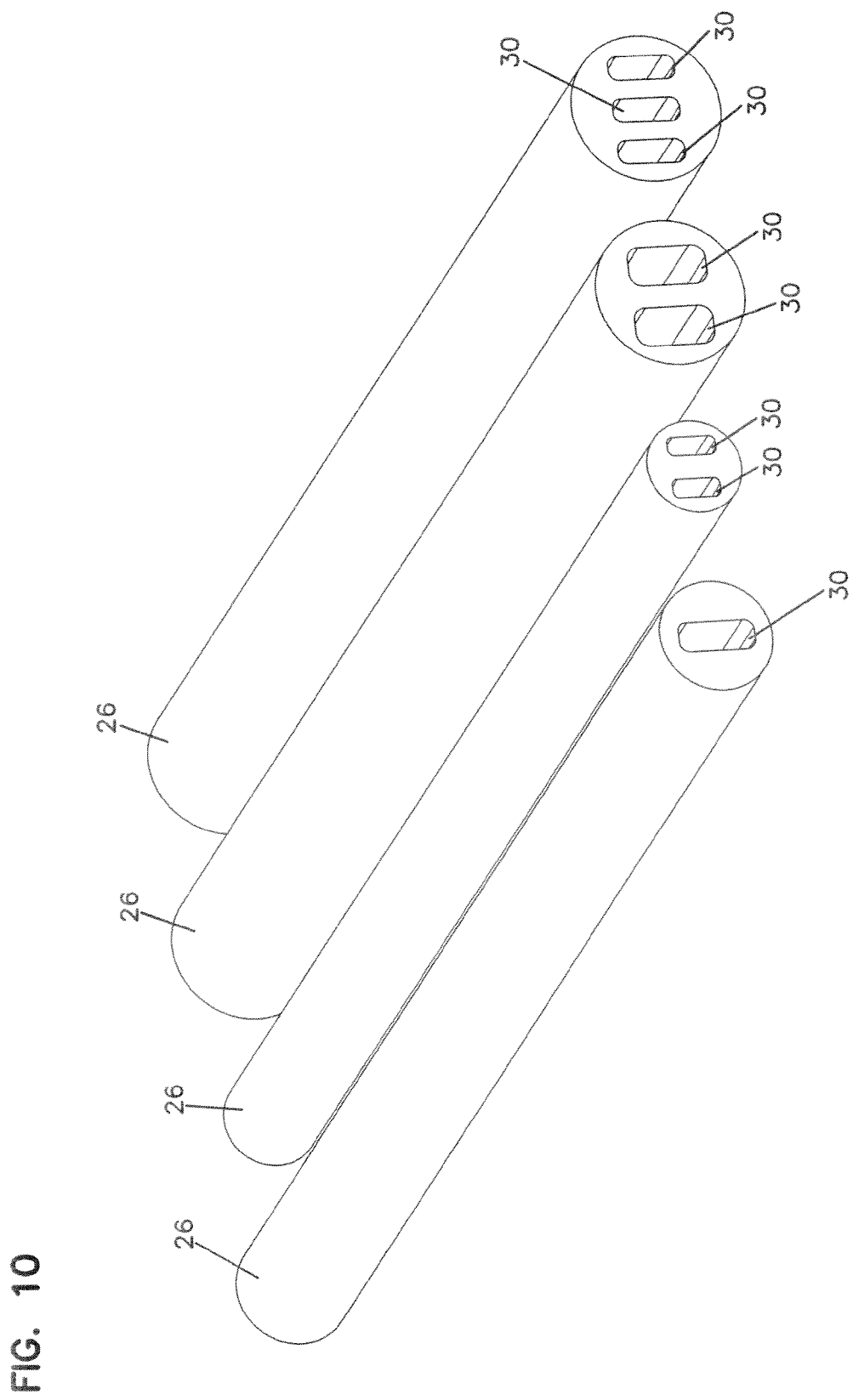
FIG. 10 illustrates various embodiments of adapter tubes that can be used with the cable fixation and sealing system of FIG. 1.

FIG. 10 illustrates a number of different examples of adapter tubes 26 having one or more non-circular ports 30. In the embodiments where the adapter tubes 26 have two or more parallel throughholes or ports 30, two or more non-circular cables 18 can be sealed and fixed using one adapter tube 26. For certain embodiments, if the port 30 of a given adapter tube 26 is sized large enough, two non-circular cables 18, such as flat drop cables, can be inserted through the single hole 30 in a juxtaposed position.

Whenever more than one flat cable 18 is being fixed using the adapter tube 26 of the present disclosure, the strength members 38 of the cables 18 may be collected together at a front end of the cable fixation module 34 and fixed together using a single strength member clamp assembly 56 of the fixation module 34.

Another advantage that may be provided by the adapter tube 26 of the present disclosure is that the tube 26 may act as an additional protective layer for the non-circular cables 18. For example, in certain embodiments, if the cables 18 are non-compatible or reactant to the sealant material 24 of the gel block 10, the adapter tube 26 may provide a protective barrier layer for the jacket of the cable 18.

Although in the present disclosure, the adapter tube 26 is shown to be molded from a unitary material, according to certain embodiments, adapter tube 26 may be formed from two or more layers. The adapter tube 26 may include an outer layer that is stiffer for the purpose of providing the fixation, and an inner layer that is softer for interacting with the jacket of the non-circular cable 18 to provide a sealing function therearound.

According to other example embodiments, the outer layer of the adapter tube 26 may include or be manufactured from a pressure-sensitive material that provides an indication to the user that the proper amount of clamping has been achieved using the cable fixation module 34 and the fixation strip 36 so as to limit damage to the fibers within the cable 18 inside the tube 26. For example, the pressure-sensitive material may change in color to indicate that a correct pressure range has been achieved in clamping the adapter tube 26. Certain embodiments of pressure sensitive materials may include pressures sensitive sheets that are configured to change color when a certain pressure is applied to the sheet. Such sheets can be used to surround at least a portion of the exterior of the adapter tube 26.

From the foregoing detailed description, it will be evident that modifications and variations can be made in the devices or methods of the disclosure without departing from the spirit or scope of the inventive aspects.

LIST OF REFERENCE NUMERALS AND CORRESPONDING FEATURES

10—Gel block
12—Telecommunications enclosure
14—Cable fixation and sealing system
15—Cable fixation and sealing kit
16—Cable entry/exit location
18—Cable
20—First portion of gel block
22—Second portion of gel block
24—Sealant
26—Adapter tube
28—Perimeter of adapter tube
30—Throughhole/port
32—First end of cable
34—Cable fixation module
36—Fixation strip
38—Strength member
40—Main body
42—First body
44—Free ends of fixation strip
46—Pocket
48—First fastener
50—Second fastener
52—Portion of cable fixation module
54—Teeth
56—Strength member clamp assembly
58—Pocket
60—Cover member
62—Pressing element
64—Third fastener
66—Strength member pocket

The invention claimed is:

1. A method of fixing and moisture sealing a telecommunications cable including a jacket defining a jacket perimeter having a generally non-circular transverse cross-section with respect to a telecommunications enclosure, the method comprising:
   slidably placing an adapter tube over the jacket of the telecommunications cable, wherein the adapter tube defines a tube perimeter having a generally circular transverse cross-section and defines a throughhole having a generally non-circular transverse cross-section that is configured to receive the telecommunications cable;
   compressing the adapter tube around the jacket of the telecommunications cable with a radial clamp for clamping and sealing the telecommunications cable relative to the adapter tube;
   placing a portion of the adapter tube that surrounds the telecommunications cable within a gel block of the telecommunications enclosure, wherein the gel block of the telecommunications enclosure is provided at a location different than the location of the radial clamp used for clamping and sealing the telecommunications cable relative to the adapter tube;
   moisture sealing the adapter tube that surrounds the telecommunications cable with sealant material of the gel block; and
   fixing the adapter tube and the telecommunications cable with respect to the telecommunications enclosure to oppose pulling forces.

2. A method according to claim 1, wherein fixing the adapter tube and the telecommunications cable with respect to the telecommunications enclosure includes at least partially bending a flexible strip defined by the radial clamp around the adapter tube and tightening the flexible strip defined by the radial clamp around the adapter tube with a cable fixation device.

3. A method according to claim 2, wherein the cable fixation device is removably mounted to the telecommunications enclosure.

4. A method according to claim 2, wherein fixing the adapter tube and the telecommunications cable with respect to the telecommunications enclosure further includes clamping a strength member of the telecommunications cable with the cable fixation device against pulling forces.

5. A method according to claim 1, wherein the telecommunications cable is an optical flat drop cable.

6. A method according to claim 1, wherein the adapter tube is a unitarily-molded flexible rubber structure.

* * * * *